(12) United States Patent
Thurner

(10) Patent No.: US 7,581,226 B2
(45) Date of Patent: Aug. 25, 2009

(54) SOFTWARE APPLICATION SOFTWARE ARCHITECTURE AND METHOD FOR THE CONSTRUCTION OF SOFTWARE APPLICATIONS ESPECIALLY FOR MEASURING SYSTEMS

(75) Inventor: Elmar Thurner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 737 days.

(21) Appl. No.: 10/504,938

(22) PCT Filed: Feb. 12, 2003

(86) PCT No.: PCT/DE03/00412

§ 371 (c)(1),
(2), (4) Date: Aug. 13, 2004

(87) PCT Pub. No.: WO03/071417

PCT Pub. Date: Aug. 28, 2003

(65) Prior Publication Data

US 2005/0160412 A1    Jul. 21, 2005

(30) Foreign Application Priority Data

Feb. 19, 2002    (DE) ................ 102 06 903

(51) Int. Cl.
*G06F 13/00* (2006.01)
(52) U.S. Cl. ............... 719/316; 719/331; 719/332; 717/102; 717/162
(58) Field of Classification Search .......... 719/316, 719/331, 332; 717/102, 162
See application file for complete search history.

(56) References Cited

U.S. PATENT DOCUMENTS

| 5,410,703 | A | 4/1995 | Nilsson et al. |
| 5,812,394 | A | 9/1998 | Lewis et al. |
| 5,862,052 | A | 1/1999 | Nixon et al. |
| 5,872,973 | A * | 2/1999 | Mitchell et al. ............. 719/332 |
| 5,983,021 | A * | 11/1999 | Mitrovic ..................... 717/158 |
| 6,427,230 | B1 * | 7/2002 | Goiffon et al. ............... 717/108 |
| 6,675,227 | B1 * | 1/2004 | Gavrilo et al. ............... 719/316 |
| 6,757,720 | B1 * | 6/2004 | Weschler, Jr. ............... 709/220 |
| 6,785,882 | B1 * | 8/2004 | Goiffon et al. ............... 717/120 |
| 6,795,826 | B2 * | 9/2004 | Flinn et al. .................. 707/100 |
| 7,246,358 | B2 * | 7/2007 | Chinnici et al. ............. 719/315 |
| 7,266,821 | B2 * | 9/2007 | Polizzi et al. ............... 718/100 |
| 2002/0104068 | A1 | 8/2002 | Barrett et al. |
| 2004/0031015 | A1 * | 2/2004 | Ben-Romdhane et al. ... 717/107 |
| 2004/0216129 | A1 * | 10/2004 | Hartnett ..................... 719/315 |
| 2006/0150172 | A1 * | 7/2006 | Heath et al. ................ 717/162 |

OTHER PUBLICATIONS

Dirk Kozian, "Transparenz über die Abläufe schaffen", Elektrotechnik für die Automatisierung 11, Nov. 17, 1999, pp. 66, 68-69.

Dewayne E. Perry and Alexander L. Wolf, "Foundations for the Study of Software Architecture", ACM SIGSOFT, Software Engineering Notes, vol. 17, No. 4, Oct. 1992, pp. 40-52.

* cited by examiner

*Primary Examiner*—Andy Ho

(57) ABSTRACT

Objects (with data, attributes, behavior, functions) for software applications, especially MES-applications, are linked to meta information and structured as hierarchical trees (whereby different forms of representation can be selected) and are branched or cross-linked together (laterally and/or horizontally). During the running time, the objects are added to form software applications whereby the common functions of the software applications are derived from the structure of the hierarchical trees. Software applications for MES-systems are constructed for automation systems, for industrial controls (also movement controls) and for office applications (office area).

39 Claims, 6 Drawing Sheets

SOFTWARE APPLICATION SOFTWARE ARCHITECTURE AND METHOD FOR THE CONSTRUCTION OF SOFTWARE APPLICATIONS ESPECIALLY FOR MEASURING SYSTEMS

CROSS REFERENCE TO RELATED APPLICATIONS

This application is the U.S. National Stage of International Application No. PCT/DE03/00412, filed Feb. 12, 2003 and claims the benefit thereof. The International Application claims the benefits of German application No. 10206903.4 filed Feb. 19, 2002, both of the applications are incorporated by reference herein in their entirety.

FIELD OF INVENTION

The invention relates to software applications, in particular MES applications, comprising objects which contain and/or reference data and/or attributes and/or behaviors, whereby the objects run on and/or are stored on at least one computer unit.

Furthermore, the invention relates to a software architecture, in particular for MES applications, and to a method for building software applications, in particular for MES systems.

The invention further relates to a software development environment, a computer program, a data medium and a data processing device.

BACKGROUND OF INVENTION

The use of what are referred to as Manufacturing Execution Systems. (MES) for automating production and manufacturing processes is known from "Software für die Automatisierung—Transparenz über die Abläufe schaffen" ("Software for automation—Creating transparency across processes), an article by Dirk Kozian in Elektronik für die Automatisierung 11, Nov. 17, 1999. These systems integrate the automation level (Controls) with the ERP (Enterprise Resource Planning) systems of the enterprise management level. Manufacturing execution systems are systems which, for example, provide information for the optimization of production sequences or handle the coordination or optimization of the production processes. On the one hand the manufacturing execution systems must supplement the general planning data of the ERP systems by including system-specific and current detailed planning data and forward this accordingly to the subordinate automation level. On the other hand they have the task of accepting production-related information from the automation level, editing this information and passing it on to the enterprise management level. One of the tasks fulfilled by MES systems is thus to implement vertical integration between the enterprise resource planning level and the automation level. Typical individual tasks of MES systems are enterprise asset management, maintenance management, information management, scheduling, dispatching and trace and tracking. Each of these tasks is executed by MES components or, as the case may be, MES applications.

In the classical programming languages (e.g. Pascal or Fortran) that were used for producing software in the eighties, data and functions were kept separate. It was not until the object-oriented programming paradigm became established that data and functions were combined to form objects. In the nineties, isolated attempts were made to assign meta data to the objects. Meta data is information about other information, for example information about existing objects themselves. This meta data is in fact present in the overall system or in the overall context, but it is neither physically stored in an object nor does it contain knowledge about the application to be implemented or about the business process to be implemented.

D. E. Perry and A. A. Wolf introduced the term "architectural style" in "Foundations for the Study of Software Architecture", ACM SIGSOFT, Software Engineering Notes, Vol. 17, No. 4. pp. 40-52, October 1992. In this publication reference is made inter alia to the consequences and influences of an architecture on an application based on that architecture. However, it does not describe how advantages in terms of the production, configuration, reorganization or modifiability of software applications can be achieved through the targeted use of meta information in a software architecture.

SUMMARY OF INVENTION

The object of the invention is to provide software applications, a software architecture and a method for producing software applications which improves the modifiability and extensibility of systems.

The aforesaid object is achieved by the claims. The meta information assigned to an object describes, for example, which data and functions an object contains, but meta information can also include descriptions for implementation and operation or user documentation. In markup languages such as HTML or XML, meta information can be described by means of what are termed tags or by means of attributes and assigned to the objects. Meta information can also be provided with a hierarchical structure. One advantage of the invention is that no explicit code generation is necessary in order to allow a software application to execute.

The objects are black boxes with appropriate access mechanisms for reading the meta data. The runtime logic and the runtime execution sequence of the software application represented by the tree are specified from the structure of the tree and from the way it is networked. The structure of the tree, which can be modified manually or automatically at runtime, and the networking of the tree elements determine which operands are supplied to functions and whether functions are executed sequentially or in parallel. In industrial installations the structure of the tree and the networking of the tree elements are used to determine, for example, which input variables are to be supplied to equipment and how the output values generated by the equipment are to be further processed. Graphical editing of the tree and the networking is performed by a user in a software development environment. The form of representation of the trees can vary and can be freely selected by the user or to suit a specific application. The networking or pointer cross-referencing of the tree elements can be achieved by the hierarchical arrangement in the tree. However, networking or pointer cross-referencing of the tree elements can also be accomplished by means of references edited by the user or by lateral networking links to elements of other subtrees. The inputs to create the tree and to establish networking links can be made using input masks, drag&drop mechanisms or voice input.

The individual objects are assigned their implementation, i.e. their code and meta information. Because the software application is assembled from prefabricated objects at runtime (e.g. automatically on the basis of the meta data relating to the application process), an explicit compiler phase for generating the code of the software application to be produced can be dispensed with. Compiler runs can take a very long time. The fact that explicit compiler runs are not required means that the time taken to produce, test and commission the software application is reduced to a minimum.

A further significant advantage is that programs and data are handled in a uniform manner. Data are object trees without functions; programs are object trees with functions. All the mechanisms present in a runtime system for assembling, networking, versioning, storing, transporting etc. data and programs only need to be implemented once and not once each for data and for programs. This also facilitates their handling for software developers, commissioning engineers and administrators, since they only have to familiarize themselves once with these mechanisms.

A further advantage is that changes can be implemented very easily. Subtrees can be added, modified or removed at any time without the entire tree structure needing to be changed. This increases the agility of an enterprise, since the enterprise can react more quickly to changed market requirements. This is important most especially when the software applications are used for controlling automation systems, production equipment or MES systems. The software applications according to the invention can also be advantageously deployed in the office environment, however.

The networking, pointer cross-referencing or referencing between the objects can take place using different degrees of granularity. Thus, networking can be achieved for example by reference to physical addresses (using pointers), thereby achieving a high level of efficiency (e.g. within the execution of a process). Other-networking mechanisms include, for example, electronic messages (e.g. e-mail), telephone or fax. The user can choose a suitable networking mechanism according to the requirements of the underlying application.

Objects, in the context of the present invention, are those objects that are used during the development of the software application, but also runtime objects. Runtime objects are objects which execute the logic of the system at the run time of a system (e.g. an application).

The software applications according to the invention are also suitable for solutions for process control systems and production automation systems.

A first advantageous embodiment of the present invention for a software application derives from the fact that at runtime the objects and/or referencing mechanisms and/or networking mechanisms and/or implementations of the objects are interchangeable. As a result of the fact that objects can be replaced at runtime by other objects, e.g. by objects with extended functionality or the implementations of objects (e.g. the new implementations have been debugged or deliver better performance) or referencing and networking mechanisms, the turnaround time in the event of changes is substantially reduced. This increases flexibility for the user and the operator of a system and the agility of an enterprise. No ordinary compiler is used for the analysis of the meta data, but rather a so-called incremental compiler or an interpreter which is active on a local object basis only at the time of replacement.

Code is generated, if necessary incrementally, for the newly deployed object and the incremental compiler or interpreter inserts the newly deployed object (or, as the case may be, the referencing mechanism and/or networking mechanism and/or a new implementation of objects) into the tree again at runtime, without the need to take into account other (unaffected) parts of the tree.

A further advantageous embodiment of the present invention for a software application derives from the fact that services can be added to the objects at runtime. The services use the local object meta data in order to make (MES or control) infrastructure functions generically available. Services of this kind can include, for example, serialization, replication, encryption or access control. In this way the objects can be equipped with what is called "Quality of Services". A user of an object can rely on the execution of these services and abstract from their implementation.

A further advantageous embodiment of the present invention for a software application derives from the fact that implementations of the referencing mechanisms or the networking mechanisms or the services can be used for data and for programs. This means that the mechanisms and the services do not have to be implemented separately for data and for programs every time. Furthermore, meta information can be added to all objects (regardless of whether they are data objects or program objects) in the same way and the meta information can be accessed in the same way for all objects.

A further advantageous embodiment of the present invention for a software application derives from the fact that the objects are networked statically and/or dynamically. Networking links (or, as the case may be, pointer cross-references or references) can be implemented statically in a manual building of the tree, but can also be generated automatically on the basis of current information or meta information (e.g. as necessary). This increases the flexibility for a user. Networking links can be set up using different mechanisms and implementations: e.g. pointers to objects, e-mail to objects or networking via OPC protocols (OPC stands for OLE for Process Control). OPC protocols are frequently used in the industrial environment in particular. Further techniques or implementations which can be used for networking or for linking are, for example, MSMQ (Microsoft Message Queue), HTTP (Hypertext Transfer Protocol) or SOAP (Simple Object Transfer Protocol).

A further advantageous embodiment of the present invention for a software application derives from the fact that the objects physically contain the meta information. This supports the principle of locality during the development of the software application, i.e. all information (including the meta information) which is important for an object is also physically present in the object. Access to this information is simplified as a result. Because the objects physically include the meta information, an object can also be used on its own for the organization, reorganization or reconfiguration of the software application, as a function of which meta information (type and scope) is present in the object. This is of advantage in particular for mobile objects, e.g. for software agents which move from computer to computer on the Internet (or other networked systems such as, for example, an intranet) in order, for example, to collect information on an installation, in each case on a local computer basis, in a highly efficient manner e.g. for a maintenance system.

A further advantageous embodiment of the present invention for a software application derives from the fact that the meta information contains static and/or dynamic object models. Object models of this kind include, for example, classes and their relationships, state/event models, activity models, deployment models or domain models (e.g. MES process model in specific branches of industry such as, for example, automobile manufacture, fertilizer production). This is of advantage in particular for generic software development or for software generators.

A further advantageous embodiment of the present invention for a software application derives from the fact that the meta information describes an application or a business process. If the meta information contains not only information about the object itself, but also information about the entire software application, about the deployment environment or about the business process (or business logic) to be implemented, then the configuration of the software application is simplified as a result, up to a point where a configuration can be performed automatically. Reconfigurations (e.g. following system crashes or failure of parts of the system) can also be performed automatically without human intervention. This increases the agility of an enterprise and the availability of the production system.

A further advantageous embodiment of the present invention for a software application derives from the fact that each individual object contains the entire meta information relating to the application or the business process. This means that in a software application or in a software system the entire description of the application or also of a business process is contained in each individual object (e.g. in the very smallest tag, in each variable or in each operator, i.e. also in the very fine granular objects). As a result of this information, each individual object can be used for a reorganization, but also a self-organization of the application, the system or the business process. This is very advantageous, for example, in the case of system errors when large parts of the system fail. The system can regenerate itself completely from the smallest part that is still operational. A maintenance engineer therefore does not need to be concerned with the laborious task of obtaining and reading documentation.

A further advantageous embodiment of the present invention for a software application derives from the fact that the trees can be represented in different views on a display device. The trees can be represented differently, for example using a static Explorer-like notation or in the form of workflow or flow diagrams (flowcharts, activity diagrams) or, for example, in the form of block diagrams (e.g. circuit diagrams) or layout plans (e.g. physical equipment layout, material flow plans). This greatly increases the flexibility for a user, for he can choose a notation or visualization appropriate to his level of knowledge in order to inspect the meta information present in the runtime system. It is also possible to switch between the different forms of representation.

A further advantageous embodiment of the present invention for a software application derives from the fact that if an error occurs the software application reconfigures itself. If, in a software application or in a software system, the entire description of the application or also of a business process is contained in each individual object (e.g. in the very smallest tag, in each variable or in each operator, i.e. also in the very fine granular objects), this information can be used for an automatic reorganization, i.e. a self-healing of the application, the system or the business process. User interventions are no longer required and downtimes are minimized. There is therefore no need for a maintenance engineer to be concerned with the laborious task of obtaining and reading documentation.

A software architecture is a description of subsystems, components (subsystems and components are represented by objects of different granularity) and the relationships between them. Subsystems and components are typically specified in different views and represent functional and non-functional properties for a software application based on a software architecture. A software architecture is intended to exhibit software design principles recognized as advantageous (locality principle, tight binding, loose coupling, etc.). A software architecture must take into account different factors that are important to a software system or a software architecture: structure, function, data, behavior, dynamics, non-functional properties, etc. These factors can be modeled by means of sometimes different description means or forms of representation. Suitable description means include, for example, UML (Unified Modeling Language), comprising a set of different diagram types and description techniques. The components which can be used in a software architecture can be differentiated, for example, into: data elements (which contain the information), processing elements (which process and/or transform the data elements) and connecting elements (which connect the two other component types to each other or among themselves).

All the description means and forms of representation constitute meta information which according to the depicted invention is present in the objects of the runtime system at runtime, and can be used on an object-local basis at runtime.

As a result of the explicit and targeted use of meta information in the software architecture on which a software application is based, the present invention has a positive effect in particular on the non-functional properties of the software application, such as modifiability, efficiency, reliability, testability, reusability, maintainability, reconfigurabilty, and self-reorganization e.g. in the event of an error.

The meta information assigned to an object describes, for example, which data and functions an object contains, but meta information can also include implementation and control information or comprise user documentation. In markup languages such as HTML or XML, meta information can be described by means of what are termed tags or by way of attributes and assigned to the objects. Meta information can also be provided with a hierarchical structure. An advantage of the invention is that no explicit code generation is necessary in order to allow a software application to execute.

The objects are black boxes with appropriate access mechanisms for reading the meta data. The runtime logic and the runtime sequence of the software application represented by the tree are specified from the structure of the tree and from the way it is networked. The structure of the tree and the networking of the tree elements determine which operands are supplied to functions and whether functions are executed sequentially or in parallel. In industrial installations the structure of the tree and the networking of the tree elements are used to determine, for example, which input variables are to be supplied to equipment and how the output values generated by the equipment are to be further processed. Graphical editing of the tree and the networking is performed by a user in a software development environment. The form of representation of the trees can vary and can be freely selected by the user or selected to suit a specific application. The networking or pointer cross-referencing of the tree elements can be achieved by the hierarchical arrangement in the tree. However, networking or pointer cross-referencing of the tree elements can also be accomplished by means of references edited by the user or by lateral networking links to elements of other subtrees. The inputs to create the tree and to establish networking links can be made using input masks, drag&drop mechanisms or voice input.

The individual objects are assigned their implementation, i.e. their code and meta information. Because the software application is assembled from prefabricated objects at runtime (e.g. automatically on the basis of the meta data relating to the application process), an explicit compiler phase for generating the code of the software application to be produced can be dispensed with. Compiler runs can take a very long time. The fact that explicit compiler runs are not required means that the time taken to produce, test and commission the software application is reduced to a minimum.

A further significant advantage is that programs and data are handled in a uniform manner. Data are object trees without functions, programs are object trees with functions. All the mechanisms present in a runtime system for assembling, networking, versioning, storing, transporting etc. data and programs only need to be implemented once and not once in each case for data and for programs. This also facilitates their handling for software developers, commissioning engineers and administrators, since they only have to familiarize themselves once with these mechanisms.

A further advantage is that changes can be implemented very easily. Subtrees can be added, modified or removed at any time without the entire tree structure needing to be changed. This increases the agility of an enterprise, since the enterprise can react more quickly to changed market requirements. This is important most especially when the software applications are used for controlling automation systems, production equipment or MES systems. The software applications according to the invention can also be advantageously deployed in the office environment, however.

The networking, pointer cross-referencing or referencing between the objects can take place using different degrees of granularity. Thus, networking can be achieved e.g. by reference to physical addresses (using pointers), thereby achieving a high level of efficiency (e.g. within the execution of a process). Other networking mechanisms include for example electronic messages (e.g. e-mail), telephone or fax. The user can choose a suitable networking mechanism according to the requirements of the underlying application.

Objects, in the context of the present invention, are those objects that are used during the development of the software application, but also runtime objects. Runtime objects are objects which execute the logic of the system at the run time of a system (e.g. an application).

The architecture according to the invention is also suitable for process control systems and production automation systems.

A first advantageous embodiment of the present invention for a software architecture derives from the fact that at runtime the objects and/or referencing mechanisms and/or networking mechanisms and/or implementations of the objects and/or communication mechanisms are interchangeable. As a result of the fact that objects can be replaced at runtime by other objects, e.g. by objects with extended functionality or the implementations of objects (e.g. the new implementations have been debugged or deliver better performance) or referencing and networking mechanisms, the turnaround time in the event of changes is substantially reduced. This increases flexibility for the user and the operator of a system and the agility of an enterprise. No ordinary compiler is used for the analysis of the meta data, but rather a so-called incremental compiler or an interpreter which is active on a local object basis only at the time of replacement. Code is generated, if necessary incrementally, for the newly deployed object and the incremental compiler or interpreter inserts the newly deployed object (or, as the case may be, the referencing mechanism and/or networking mechanism and/or a new implementation of objects) into the tree again at runtime, without the need to take into account other (unaffected) parts of the tree.

A further advantageous embodiment of the present invention for a software architecture derives from the fact that services can be added to the objects at runtime. The services use the local object meta data in order to make (MES or control) infrastructure functions generically available. Services of this kind can include, for example, serialization, replication, encryption or access control. In this way the objects can be equipped with what is called "Quality of Services". A user of an object can rely on the execution of these services and abstract from their implementation.

A further advantageous embodiment of the present invention for a software architecture derives from the fact that implementations of the referencing mechanisms or the networking mechanisms or the communication mechanisms or the services can be used for data and for programs. This means that the mechanisms and the services do not have to be implemented separately for data and for programs every time. Furthermore, meta information can be added to all objects (regardless of whether they are data objects or program objects) in the same way and the meta information can be accessed in the same way for all objects.

A further advantageous embodiment of the present invention for a software architecture derives from the fact that the objects are networked statically and/or dynamically. Networking links (or, as the case may be, pointer cross-references or references) can be implemented statically in a manual building of the tree, but can also be generated automatically on the basis of current information or meta information (e.g. as necessary). This increases the flexibility for a user. Networking links can be set up using different mechanisms and implementations: e.g. pointers to objects, e-mail to objects or networking via OPC protocols (OPC stands for OLE for Process Control). OPC protocols are frequently used in the industrial environment in particular. Further techniques or implementations which can be used for networking or for linking are, for example, MSMQ (Microsoft Message Queue), HTTP (Hypertext Transfer Protocol) or SOAP (Simple Object Transfer Protocol).

A further advantageous embodiment of the present invention for a software architecture derives from the fact that the objects physically contain the meta information. This supports the principle of locality during the development of the software application, i.e. all information (including the meta information) which is important for an object is also physically present in the object. Access to this information is simplified as a result. Because the objects physically contain the meta information, an object can also be used on its own for the organization, reorganization or reconfiguration of the software application, as a function of which meta information (type and scope) is present in the object. This is of advantage in particular for mobile objects, e.g. for software agents which move from computer to computer on the Internet (or other networked systems such as, for example, an intranet) in order, for example, to collect information on an installation, in each case on a local computer basis, in a highly efficient manner e.g. for a maintenance system.

A further advantageous embodiment of the present invention for a software architecture derives from the fact that the meta information contains static and/or dynamic object models. Object models of this kind include, for example, classes and their relationships, state/event models, activity models, deployment models or domain models (e.g. MES process model in specific branches of industry such as, for example, automobile manufacture, fertilizer production). This is of advantage in particular for generic software development or for software generators.

A further advantageous embodiment of the present invention for a software architecture derives from the fact that the meta information describes an application or a business process. If the meta information contains not only information about the object itself, but also information about the entire software application, about the deployment environment or about the business process (or business logic) to be implemented, then the configuration of the software application is simplified as a result, up to a point where a configuration can be performed automatically. Reconfigurations (e.g. following system crashes or failure of parts of the system) can also be performed automatically without human intervention. This increases the agility of an enterprise and the availability of the production system.

A further advantageous embodiment of the present invention for a software architecture derives from the fact that each individual object contains the entire meta information relating to the application or the business process. This means that in a software application or in a software system the entire description of the application or also of a business process (or, as the case may be, business logic) is contained in each individual object (e.g. in the very smallest tag, in each variable or in each operator, i.e. also in the very fine granular objects). As a result of this information each individual object can be used for a reorganization, but also a self-organization of the application, the system or the business process. This is very advantageous, for example, in the case of system errors when large parts of the system fail. The system can regenerate itself completely from the smallest part that is still operational. A maintenance engineer therefore does not need to be concerned with the laborious task of returning the system to service.

A further advantageous embodiment of the present invention for a software architecture derives from the fact that the trees can be represented in different views on a display device. The trees can be represented differently, for example using a static Explorer-like notation or in the form of workflow or flow diagrams (flowcharts, activity diagrams) or, for example, in the form of block diagrams (e.g. circuit diagrams) or layout plans (e.g. physical equipment layout, material flow plans). This greatly increases the flexibility for a user, for he can choose a notation or visualization appropriate to his level of knowledge in order to inspect the meta information present in the runtime system. It is also possible to switch between the different forms of representation.

A further advantageous embodiment of the present invention for a software architecture derives from the fact that if an error occurs the software application which is based on the software architecture reconfigures itself. If, in a software application or in a software system, the entire description of the application or also of a business process is contained in each individual object (e.g. in the very smallest tag, in each variable or in each operator, i.e. also in the very fine granular objects), this information can be used for an automatic reorganization, i.e. a self-healing of the application, the system or the business process. User interventions are no longer required and downtimes are minimized. There is therefore no need for a maintenance engineer to be concerned with the laborious task of returning the system to service.

The meta information assigned to an object describes, for example, which data and functions an object contains, but meta information can also include descriptions relating to implementation and control or comprise user documentation. In markup languages such as HTML or XML, meta information can be described by means of what are termed tags or by way of attributes and assigned to the objects. Meta information can also be provided with a hierarchical structure. An advantage of the invention is that no explicit code generation is necessary in order to allow a software application to execute. The objects are black boxes with appropriate access mechanisms for reading the meta data. The runtime logic and the runtime execution sequence of the software application represented by the tree are specified from the structure of the tree and from the way it is networked. The tree's structure, which can be modified manually or automatically at runtime, and the networking of the tree elements determine which operands are supplied to functions and whether functions are executed sequentially or in parallel. In industrial installations the structure of the tree and the networking of the tree elements are used to determine, for example, which input variables are to be supplied to equipment and how the output values generated by the equipment are to be further processed. Graphical editing of the tree and the networking arrangement is performed by a user in a software development environment. The form of representation of the trees can vary and can be freely selected by the user or selected to suit a specific application. The networking or pointer cross-referencing of the tree elements can be achieved by the hierarchical arrangement in the tree. However, networking or pointer cross-referencing of the tree elements can also be accomplished by means of references edited by the user or by lateral networking links to elements of other subtrees. The inputs to create the tree and to establish networking links can be made using input masks, drag&drop mechanisms or voice input.

The individual objects are assigned their implementation, i.e. their code and meta information. Because the software application is assembled from prefabricated objects at runtime (e.g. automatically on the basis of the meta data relating to the application process), an explicit compiler phase for generating the code of the software application to be produced can be dispensed with. Compiler runs can take a very long time. The fact that explicit compiler runs are not required means that the time taken to produce, test and commission the software application is reduced to a minimum.

A further advantage is that changes can be implemented very easily. Subtrees can be added, modified or removed at any time without the entire tree structure needing to be changed. This increases the agility of an enterprise, since the enterprise can react more quickly to changed market requirements. This is important most especially when the software applications are used for controlling automation systems, production equipment or MES systems. The software applications according to the invention can also be advantageously deployed in the office environment, however.

The networking, pointer cross-referencing or referencing between the objects can take place using different degrees of granularity. Thus, objects can be networked for example by reference to physical addresses (using pointers), thereby achieving a high level of efficiency (e.g. within the execution of a process). Other networking mechanisms include, for example, electronic messages (e.g. e-mail), telephone or fax. The user can choose a suitable networking mechanism according to the requirements of the underlying application.

The method is supported by suitable software development environments. Thus, for example, ready-made objects may be present in a repository and these can be inserted into the tree using drag&drop or other input aids (e.g. keyboard, light pen). Furthermore it is of advantage if the display device that is used for representing and for building the trees can be split into different screen areas (windowing technique).

Objects, in the context of the present invention, are those objects that are used during the development of the software application, but also runtime objects. Runtime objects are objects which execute the logic of the system at the run time of a system (e.g. an application).

The method according to the invention is also suitable for the development of software applications for process control systems and production automation systems.

A first advantageous embodiment of the present invention for a method derives from the fact that at runtime the objects and/or referencing mechanisms and/or networking mechanisms and/or implementations of the objects are interchangeable. As a result of the fact that objects can be replaced at runtime by other objects, e.g. by objects with extended functionality or the implementations of objects (e.g. the new implementations have been debugged or deliver better performance) or referencing and networking mechanisms, the turnaround time in the event of changes is substantially reduced. This increases flexibility for the user and the operator of a system and the agility of an enterprise. No ordinary compiler is used for the analysis of the meta data, but rather a so-called incremental compiler or an interpreter which is active on a local object basis only at the time of replacement. Code is generated, if necessary incrementally, for the newly deployed object and the incremental compiler or interpreter inserts the newly deployed object (or, as the case may be, the referencing mechanism and/or networking mechanism and/or a new implementation of objects) into the tree again at runtime, without the need to take into account other (unaffected) parts of the tree.

A further advantageous embodiment of the present invention for a method derives from the fact that services can be added to the objects at runtime. The services use the local object meta data in order to make (MES or control) infrastructure functions generically available. Services of this kind can include, for example, serialization, replication, encryption or access control. In this way the objects can be equipped with what is called "Quality of Services". A user of an object can rely on the execution of these services and abstract from their implementation.

A further advantageous embodiment of the present invention for a method derives from the fact that implementations of the referencing mechanisms or the networking mechanisms or the services can be used for data and for programs. This means that the mechanisms and the services do not have to be implemented separately for data and for programs every time. Furthermore, meta information can be added to all objects (regardless of whether they are data objects or program objects) in the same way and the meta information can be accessed in the same way for all objects.

A further advantageous embodiment of the present invention for a method derives from the fact that the objects are networked statically and/or dynamically. Networking links (or, as the case may be, pointer cross-references or references) can be implemented statically in a manual building of the tree, but can also be generated automatically on the basis of current information or meta information (e.g. as necessary). This increases the flexibility for a user. Networking links can be set up using different mechanisms and implementations: e.g. pointers to objects, e-mail to objects or networking via OPC protocols (OPC stands for OLE for Process Control). OPC protocols are frequently used in the industrial environment in particular. Further techniques or implementations which can be used for networking or for linking are, for example, MSMQ (Microsoft Message Queue), HTTP (Hypertext Transfer Protocol) or SOAP (Simple Object Transfer Protocol).

A further advantageous embodiment of the present invention for a method derives from the fact that the objects physically contain the meta information. This supports the principle of locality during the development of the software application, i.e. all information (including the meta information) which is important for an object is also physically present in the object. Access to this information is simplified as a result. Because the objects physically include the meta information, an object can also be used on its own for the organization, reorganization or reconfiguration of the software application, as a function of which meta information (type and scope) is present in the object. This is of advantage in particular for mobile objects, e.g. for software agents which move from computer to computer on the Internet (or other networked systems such as, for example, an intranet) in order, for example, to collect information on an installation, in each case on a local computer basis, in a highly efficient manner e.g. for a maintenance system.

A further advantageous embodiment of the present invention for a method derives from the fact that the meta information contains static and/or dynamic object models. Object models of this kind include, for example, classes and their relationships, state/event models, activity models, deployment models or domain models (e.g. MES process model in specific branches of industry such as, for example, automobile manufacture, fertilizer production). This is of advantage in particular for generic software development or for software generators.

A further advantageous embodiment of the present invention for a method derives from the fact that the meta information describes an application or a business process. If the meta information contains not only information about the object itself, but also information about the entire software application, about the deployment environment or about the business process (or business logic) to be implemented, then the configuration of the software application is simplified as a result, up to a point where a configuration can be performed automatically. Reconfigurations (e.g. following system crashes or failure of parts of the system) can also be performed automatically without human intervention. This increases the agility of an enterprise.

A further advantageous embodiment of the present invention for a method derives from the fact that each individual object contains the entire meta information relating to the application or the business process. This means that in a software application or in a software system the entire description of the application or also of a business process is contained in each individual object (e.g. in the very smallest tag, in each variable or in each operator, i.e. also in the very fine granular objects). As a result of this information each individual object can be used for a reorganization, but also a self-organization of the application, the system or the business process. This is very advantageous, for example, in the case of system errors when large parts of the system fail. The system can regenerate itself completely from the smallest part that is still operational. A maintenance engineer therefore does not need to be concerned with the laborious task of returning the system to service.

A further advantageous embodiment of the present invention for a method derives from the fact that the trees can be represented in different views on a display device. The trees can be represented differently, e.g. using a static Explorer-like notation or in the form of workflow or flow diagrams (flowcharts, activity diagrams) or, for example, in the form of block diagrams (e.g. circuit diagrams) or layout plans (e.g. physical equipment layout, material flow plans). This greatly increases the flexibility for a user, for he can choose a notation or visualization appropriate to his level of knowledge in order to inspect the meta information present in the runtime system. It is also possible to switch between the different forms of representation.

A further advantageous embodiment of the present invention for a method derives from the fact that if an error occurs the software application reconfigures itself. If, in a software application or in a software system, the entire description of the application or also of a business process is contained in each individual object (e.g. in the very smallest tag, in each variable or in each operator, i.e. also in the very fine granular objects), this information can be used for an automatic reorganization, i.e. a self-healing of the application, the system or the business process. User interventions are no longer required and downtimes are minimized. There is therefore no need for a maintenance engineer to be concerned with the laborious task of obtaining and reading documentation.

A further advantageous embodiment of the present invention consists in a software development environment which is integrated into the runtime system, with selectable functionalities being accessed via views. The traditional software development environment is thus reduced to representations and editors by means of which the runtime system can be observed and modified directly. Advantages of this construction principle or of this architecture include system and data consistency, as well as easier modifiability of the runtime system. Thus, the views, which are implemented for example by means of editors, can be used to access application functions of the runtime system (operator view) or else to implement changes or expansions (engineering or maintenance view).

A further advantageous embodiment of the present invention is that the inventive software application or the inventive method and the software development environment are implemented by means of a computer program. This means that any modifications or adaptations can be easily carried out.

further advantageous embodiment of the present invention is that the computer program for the inventive method and/or for the software development environment is stored on a data medium. This makes the method easy to handle with regard to logistics and distribution. Data media are, for example, familiar computer program products such as, for example, floppy disks or CDs.

A further advantageous embodiment of the present invention is that the computer program for the inventive method and/or for the software development environment is installed on a data processing device. Performance is increased as a result.

Further advantages and details of the invention will emerge with reference to the following description of advantageous exemplary embodiments and in connection with the figures. Insofar as elements having identical functionalities are described in different figures, said elements are designated by means of the same reference symbols.

DETAILED DESCRIPTION OF INVENTION

Figure 1:
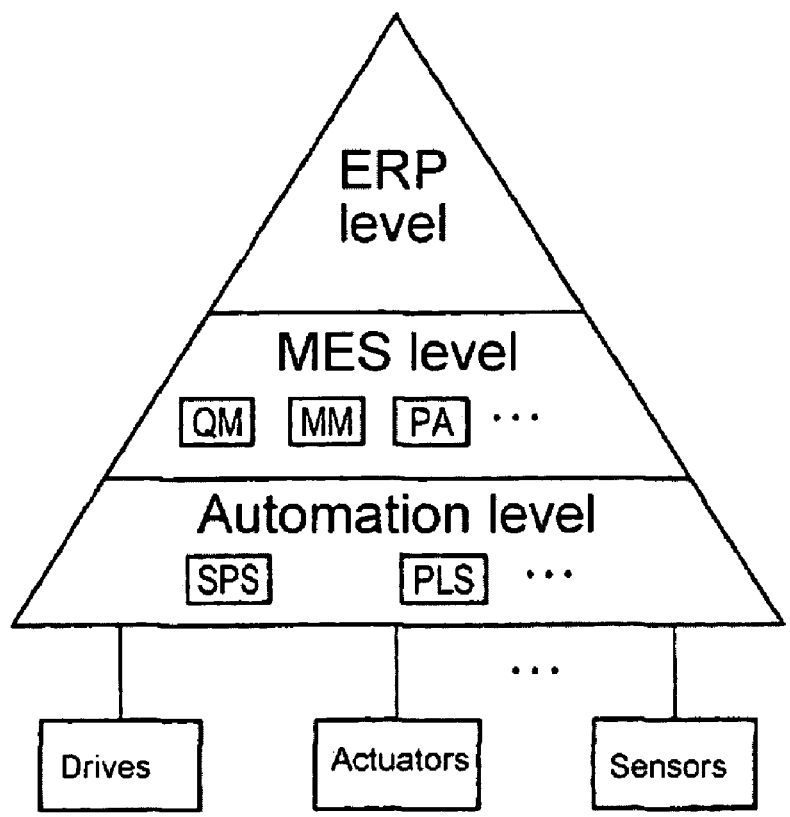
FIG. 1 shows in a schematic overview representation the "enterprise pyramid" with three control levels.

The diagram according to FIG. 1 shows in a schematic overview representation the three control levels such as they are typically to be found in a producing or manufacturing enterprise. The pyramid shape of the diagram is intended to convey that a compression of the information takes place from the bottom up. The topmost level is the ERP (Enterprise Resource Planning) level. It is at this executive management level of an enterprise that the business administration and sales functions in the enterprise are usually performed (e.g. finance, sales and marketing, human resources, reporting). However, logistical tasks extending across different production systems are also performed at this level (e.g. job scheduling and materials management). The SAP R/3 system is an ERP system which is very frequently used at the enterprise resource planning level.

The lowest level of the pyramid is the automation level (Controls). At this level stored program controllers (SPS) are usually used in conjunction with visualization and process control systems (PLS). The drives, actuators and sensors of the production and/or manufacturing equipment are directly connected to the systems of this level.

The connecting element between the ERP level and the automation level is formed by the MES level. The applications of the MES level thus provide a means of vertical integration between the ERP level and the automation level. On the one hand the MES applications must supplement the general planning data of the ERP systems with production system-specific detailed planning data and forward this information to the systems of the automation level, while on the other hand it is the task of the MES applications to accept, edit and then forward production-related data from the automation level to the ERP level (executive management level of the enterprise).

Typical MES applications include quality management (QM), maintenance management (MM), performance analysis (PA), process management, labor management, and asset management. The three dots shown at each level in FIG. 1 are intended to convey that there may be further elements (applications, systems, etc.) at a particular level.

MES systems or ERP systems as a rule contain what is known as a runtime system for scheduling the execution times of the components involved (subcomponents, modules, tasks, operating system processes, etc.), as well as what is known as an engineering system for creating and editing programs which are provided for execution in the runtime system.

Figure 2:
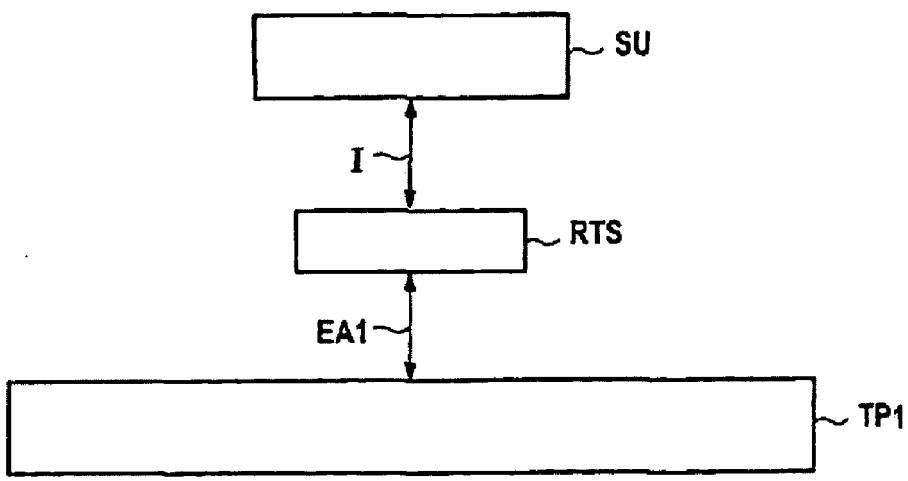
FIG. 2 shows a schematic representation with a traditional software development environment, a runtime system and a technical process that is to be controlled.

The diagram according to FIG. 2 shows a schematic representation comprising a traditional software development environment SU, a runtime system RTS and a technical process TP1 that is to be controlled. These days, software applications are developed methodically and according to best-practice engineering principles. Tools (called CASE tools, where CASE stands for Computer Aided software Engineering) are typically used for this purpose. These CASE tools support compliance with methods and standards in order to increase the productivity of the software developers, but also to improve the quality of the software produced. The CASE tools are made available to the software developers via a software development environment SU. This software development environment SU is part of the workstation for a software producer. A software development environment SU supports a software producer in all phases of software development, i.e. from the early analysis phases through to the late testing phases. Suitable utility routines, such as e.g. editor, compiler, and debugger, but also analytical and design tools, are available to a developer for all the phases of software development.

The workstation of a software developer typically consists of a computing unit with processor and memory, together with output units such as screen, display and input aids such as keyboard and mouse as well as the utility routines that are required for software development (editor, compiler, etc.). These utility routines can be very easily invoked and used by a software developer via a suitable software development environment SU. Modern software development environments SU also enable access to configuration management tools and to change management tools.

Today's advanced software development environments SU support in particular the paradigms of object orientation such as the creation of objects, the creation of classes, the creation of superclasses, as well as the representation of inheritance relationships. Suitable editors, mask input or drag&drop mechanisms are used to link the objects with meta information, structure the objects as hierarchical trees and also network them with one another. The software applications produced with the aid of the software development environment SU must finally be executed on a target system or on a target computer in order, for example, to control a technical process TP1. The target system typically consists of one computing unit to a plurality of computing units with processors and storage devices as well as a runtime system RTS. The programs developed with the aid of the software development environment SU are loaded onto the runtime system RTS via the information path I. The underlying technical process, e.g. for an automation solution or an MES solution, is controlled via the input/output connection EA1. Actuators, for example, are influenced from the runtime system RTS to the technical process TP1 via the I/O connection EA1, while sensor data, for example, is supplied from the technical process TP1 back to the runtime system RTS via the I/O connection EA1, which sensor data is then processed further in the software application. A runtime system RTS can also be distributed across a plurality of computer units.

Figure 3:
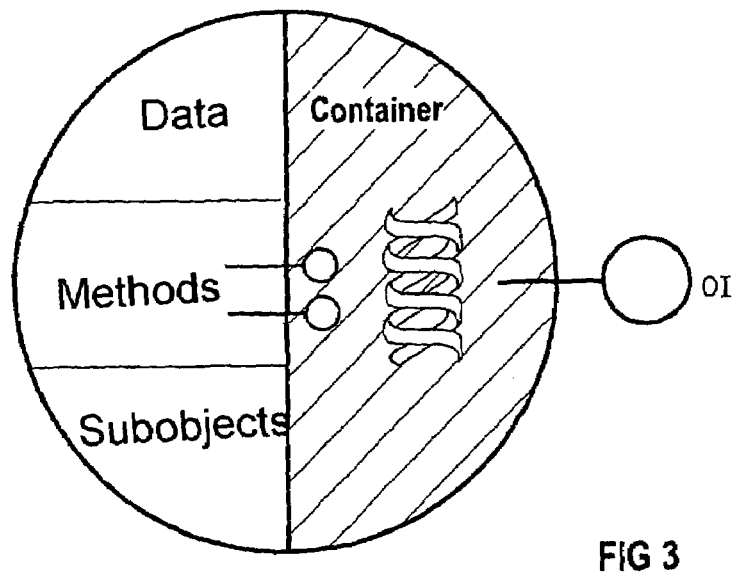
FIG. 3 shows the schematic representation of an object.

The diagram according to FIG. 3 shows the schematic representation of an object with an object interface OI. An object is generally an object or an element of a domain or a discourse world. In object-oriented software development, an object is an individual exemplar of things or entities (e.g. robot, car, machine), persons (e.g. customer, employee, patent attorney) or concepts from the real world (e.g. order) or the conceptual world (e.g. juristic and natural persons or organizations). An object possesses a certain defined state and reacts with a defined behavior to its environment. Each object also possesses an object identity which distinguishes it from all other objects and which permits it to access a specific object. An object can know one or more other objects. Connections or pointer cross-references or networking links exist between objects that know each other. The state of an object is determined by its data or attribute values and the particular connections to other objects. The behavior of an object is defined by its set of methods or operations. In object-oriented programming, the type of an object is described by a class. Real incarnations or instances, which then correspond to an actual programming language object, can be generated from this type description. Objects and their connections can be represented graphically with the aid of object diagrams. The editors used for object diagrams are part of the software development environment (SU; FIG. 2). UML (Unified Modeling Language) provides a number of notations for the graphical representation of object-oriented concepts (business process diagram, state diagram, activity diagram, collaboration diagram, sequence diagram, class diagrams, etc.). These diagrams can be edited and processed by a user with the software development environment (SU; FIG. 2).

The left-hand part of FIG. 3 shows the information or elements which an object usually contains. Data includes such simple things as a numeric value but also complex structures such as recipes, orders or archives. Methods (often also referred to as operations) represent executable activities in relation to an algorithm. The set of methods determines the behavior of an object instantiated by this class. The methods of an object can be used or invoked by other objects in a comparable way to a client-server architecture. Moreover, objects can contain so-called subobjects, which they require in order to implement their methods. A structural organization of an object is determined by the subobjects.

On the right-hand side of the diagram shown in FIG. 3, an element known as a container is depicted by hatching. The inventive mechanisms for holding the meta information and the mechanisms for accessing this meta information are implemented by means of this container. The containers represent an encapsulating layer around the object, and all accesses to an object can only be effected via the interface OI. The methods and data and also the meta information of the object are accessed via the interface OI. In an access to the data, the methods or the meta information a user can therefore abstract from the implementation of data methods and meta information. All accesses to an object are effected via the interface OI. This can very greatly facilitate the reusability and interchangeability of objects. Thus, even in a complex system, for example a software system, objects can always be accessed in the same way. In particular, the containers make infrastructure functions such as data networking, data storage and data visualization available in a uniform way for all types of objects (for example business objects). A double helix comparable to a DNA structure of a human cell is depicted schematically in the container. This is intended to illustrate that an object contains parts or all of the meta information, that is to say also the structural information and the logic that is inherent in, for example, a business process. This enables the entire system or the entire application to be organized or reorganized from a single object. As a result, downtimes of a system can be minimized and maintenance work completed very efficiently.

The infrastructure functions that a container provides also include, for example, trace functions, in other words, who has used an object, and for how long. As mentioned already, the container contains meta information, self-description information for the object. This enables measurements, but also security mechanisms, to be inserted as well.

Figure 4:
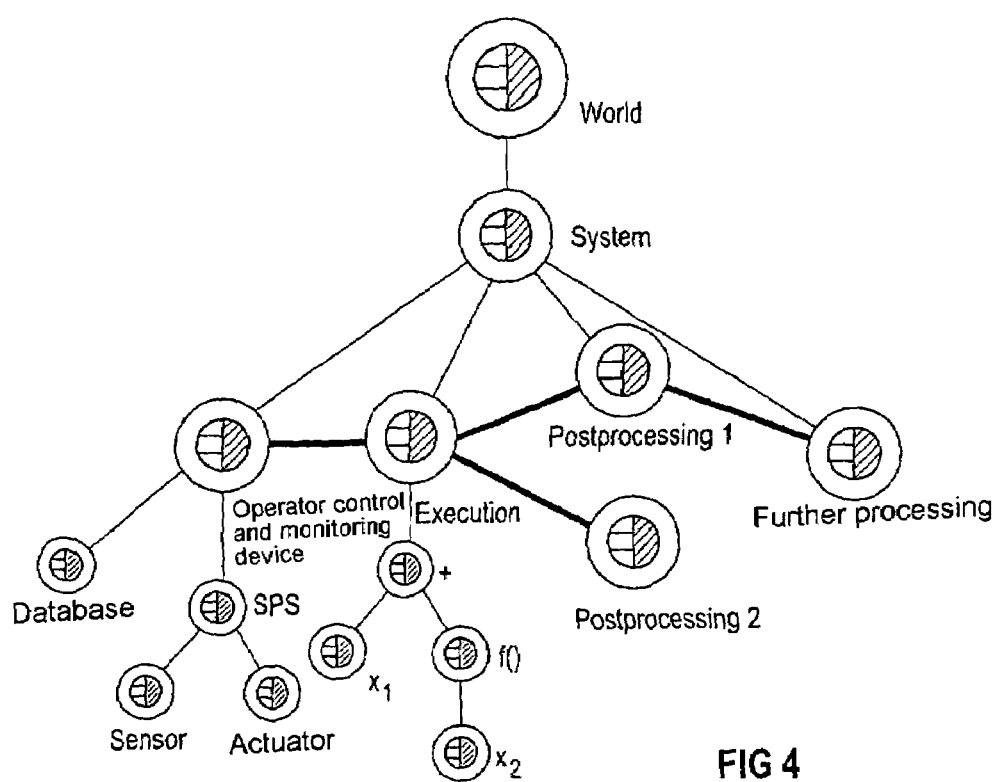
FIG. 4 shows the tree structure of a software application.

The diagram according to FIG. 4 shows the tree structure of a software application. In this case the objects are represented as double circles. The inner circle schematically represents the structure of an object, as known from FIG. 3. Here, the left half of an object again represents the data methods and subobjects, while the right hatched half represents the container which contains the meta information and provides the infrastructure information for an object. The container represents an encapsulating layer for the object. The object can only be accessed via the object interface OI which is provided by the container. Infrastructure functions include, for example, data networking, data storage and data visualization. The container makes these functions available in a uniform way for all other objects.

The outer circles around the objects signify that the objects are ultimately embedded in the infrastructure of a system. One aspect of the infrastructure is the networking. Networking or cross-referencing by pointer can be implemented in a very fine granular way, e.g. via storage pointers. However, it can also be effected via the Internet, via e-mail or via telephone connections.

In the diagram according to FIG. 4, the connecting lines drawn in bold between the objects indicate that these objects are interconnected laterally. In the industrial environment, a lateral connection of this kind can be, for example, a connection via OPC (OLE for Process Control). Such a connection or, as the case may be, an infrastructure service can also be implemented via message queue mechanisms. Access to infrastructure services or functionalities is provided via the container and is the same for all the objects in a tree, regardless of whether the object is a B&B (operator control and monitoring) device or a stored program controller (SPS). For this reason it is also very easy to modify the implementation of an infrastructure service, since the specification remains unchanged. The outer circle of an object therefore represents a collection of infrastructure services or infrastructure functions which can be used via a container. Once implemented, an infrastructure service can be used by all objects in the same way.

The diagram according to FIG. 4 shows a software application in which the objects are structured in the form of a hierarchical tree. The system to be implemented or the software application contains a B&B device with a database DB, with the B&B device being supplied by a stored program controller (SPS). The SPS accesses actuators and sensors via input/output functions. The results of the operator control and monitoring (B&B) device are processed further by an object "Execution". The algorithm for this further processing in the object "Execution" is represented by the subtree hanging under the object "Execution". In this case a value X1 is processed by means of a function F, where the function F is assigned the value X2 as input value. Following the execution of this Execution component, further post-processing operations are performed, represented by the objects "Postprocessing 1" and "Postprocessing 2". The operations performed here can be, for example, compression or display functions. FIG. 4 illustrates that the results of the post-processing by "Postprocessing 1" undergo a further processing step by the object "Further Processing". A software system or software application described in this way can of course be combined with further software applications described in this way and form part of a higher-order world, depicted here in FIG. 4 by the object "World".

In addition to the hierarchical structuring, as given by the structure of the tree, the objects can also be networked, reflected or cross-referenced laterally and/or horizontally with one another by means of pointers. This is indicated in FIG. 4 by the bold lines. Pointer cross-references of this kind can be modeled via input masks or also established using drag&drop mechanisms.

The function that is implemented by a software system or by a software application results from the structure, the hierarchy and the networking of the tree objects. The tree elements, in other words the objects, are processed and executed as a function of a traversing algorithm that is to be provided as a basis. The execution of a software application is comparable with the mode of operation of the human nervous system, where the individual neurons are interconnected via dendrites and synapses and exchange their activities among one another, with a stimulus triggering a chain of impulses through the body and a chain of impulses of this kind is executed according to how the neurons are networked. In the system or software application or even software architecture according to the invention, a chain of events is also triggered by the structure and the networking of the objects which are comparable with the neurons in the human body, as by a stimulus as shown in FIG. 4, e.g. when a sensor forwards an event to an SPS and this event is registered via the B&B device and then an execution is started which in turn triggers "Postprocessing 1" and "Postprocessing 2" to perform a further processing operation, whereby after the further processing "Postprocessing 1" initiates another further processing operation. Software applications produced in this way have very advantageous properties. Thus, for example, the objects that are required for an application are not combined until runtime, as a result of which such applications exhibit very high levels of modifiability and flexibility. If changes are to be made, an object does not have to be compiled first. An object which is newly introduced into the system and replaces another one can be very easily integrated if it has the same interface and the same specification as the object to be replaced and only differs in its implementation, for example by delivering better performance.

Figure 5:
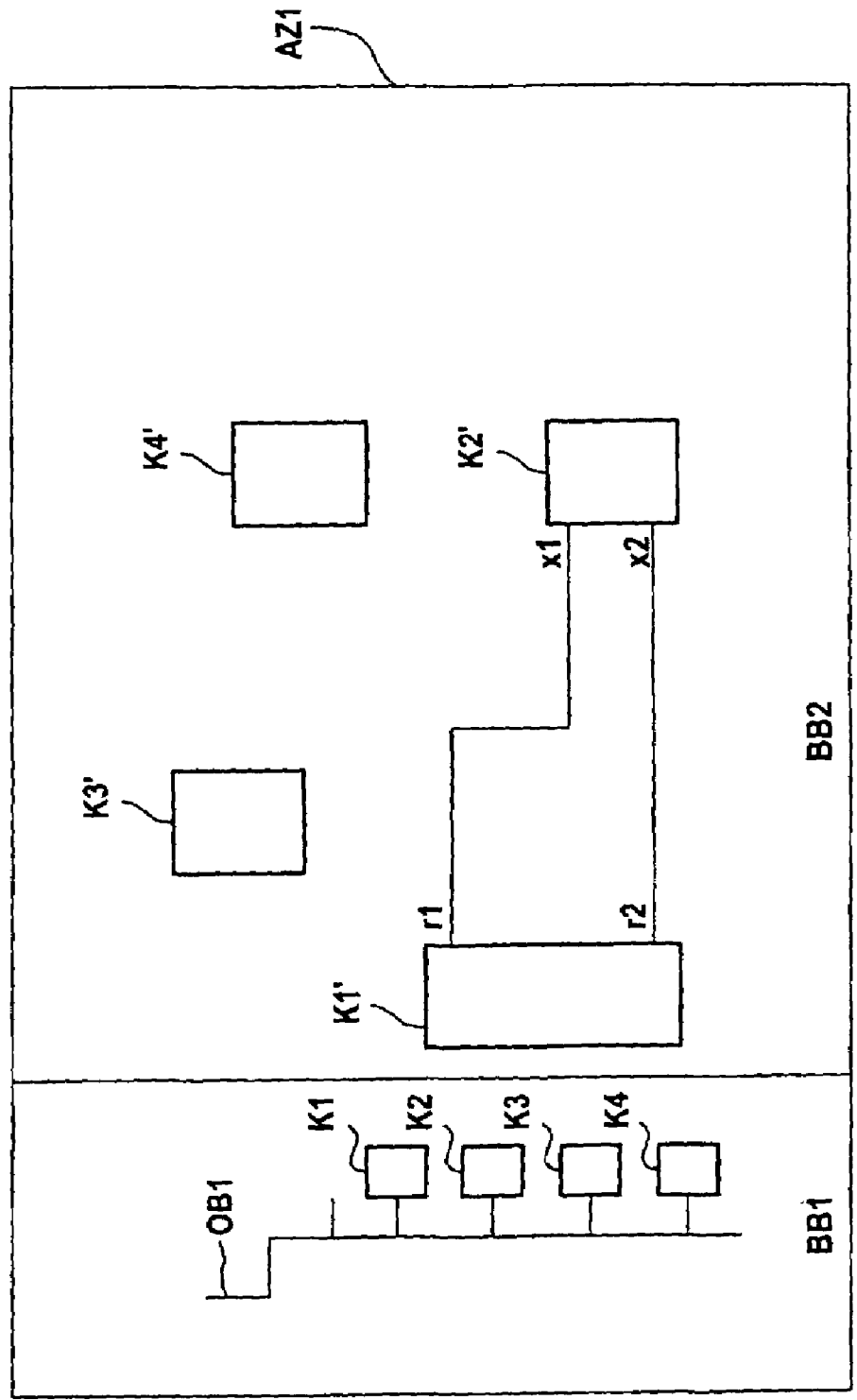
FIG. 5 shows a form of representation of a tree.

The diagram according to FIG. 5 shows a form of representation for a tree. FIG. 5 depicts a display device AZ1 having the two screen areas BB1 and BB2. A display device AZ1 can be, for example, a monitor or a display. The display device AZ1 is typically an element of a software development environment (SU; FIG. 2). Display devices and input aids such as, for example, keyboard or mouse are used to generate objects on the screen, structure them hierarchically in the form of a tree and link them to one another by means of networking or pointers, but also to provide them with meta information or other information. It is conceivable that a display device AZ1 contains further screen areas for the representation of trees, but also to implement inputs (e.g. menu bars). A software application is assembled at runtime from the objects of a tree. The structure is important for the processing of the objects, but so also is the networking of the objects. If a user (for example a systems integrator or maintenance engineer) wants to introduce changes, then he requires a representation of the tree that satisfies his corresponding requirements and needs. In the diagram as depicted in the screen area BB1 on the left-hand side of FIG. 5, a tree OB1 is shown with the tree elements K1, K2, K3, K4, and what's more it is shown in an Explorer-like notation. The representation of a tree as shown in the screen area BB2 corresponds to a notation as used, for example, for circuit diagrams. The elements K1' and K2' shown in the screen area BB2 are represented as a tree structure via input (x1, x2) and output variables (r1, r2) which are interconnected by lines in each case. A representation in this form of circuit diagrams is of interest in particular to electricians, for electricians think in terms of circuit diagrams. It is possible to modify the representation of a tree by way of input aids and to choose the most practical form of representation for the particular user group in each case. User groups are, for example, maintenance engineers, systems integrators and developers, but also marketing and sales people.

Figure 6:
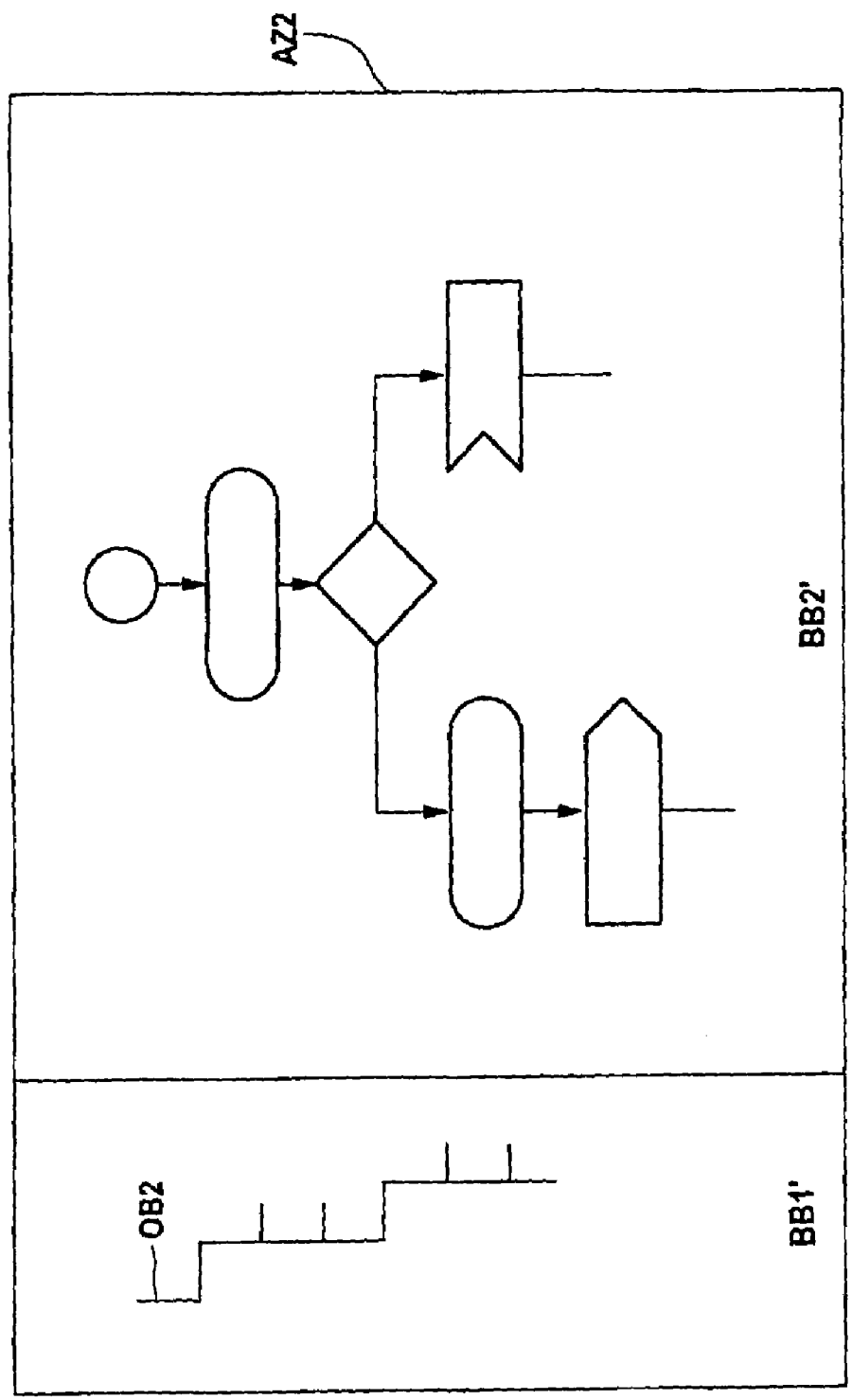
FIG. 6 shows a further form of representation of a tree.

The diagram according to FIG. 6 shows a further possible way in which a tree can be represented on a display device AZ2. The left-hand section of FIG. 6 shows a screen area BB1' with an object tree OB2 in an Explorer-like structure. The right-hand part of FIG. 6 shows a screen area BB2' in which a tree is represented using a notation which is very advantageous, in particular for the representation of business processes. People in the accounting department or in the management of the enterprise think in terms of such business process workflows (business processes). The degree of user friendliness and also of efficiency when trees are created or when trees are modified is greatly increased by the possibility of switching between different forms of representation. It means that a user can abstract from the internal representation or implementation of a tree. When creating a tree or modifying a tree, there is nothing to be programmed from scratch, but instead everything can be configured for the specific project. This is advantageous for efficiency in the production of software applications, but also for the creation of software architectures.

Figure 7:
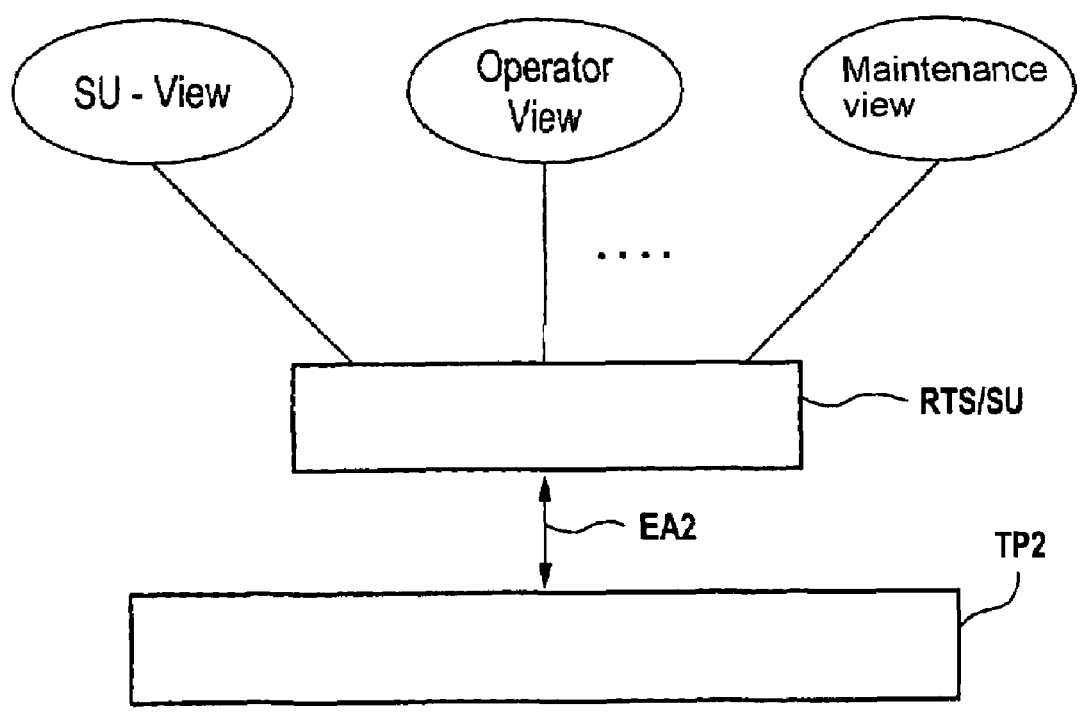
FIG. 7 shows a schematic representation comprising a runtime system and a technical process that is to be controlled, with functions of the software development environment being integrated into the runtime system.

The diagram according to FIG. 7 shows a schematic representation with an extended runtime system RTS/SU and a technical process TP2 that is to be controlled, with functions of the software development environment being integrated in the extended runtime system RTS/SU. The functions required in a particular case are accessed by what are known as views. FIG. 7 shows views for development (SU View), for operator control (Operator View) and for maintenance (Maintenance View). The ellipsis serves to indicate that further views may be present. The extended runtime system RTS/SU contains the infrastructure for the development and modification of the runtime system. The connection to the technical process TP2 to be controlled is established via input/output connections EA2.

It is a significant effect of the invention that large parts of the functionality of a traditional software development environment (SU; FIG. 2) are covered by the runtime system RTS/SU. Meta data is to a great extent data which is generated in any case in the course of development. Thus, runtime system and software development environment can, as it were, merge with each other and no longer have to be embodied as separate components. A system which is modifiable contains many aspects at runtime which today are only present in development environments (modeling, versioning, compilation, etc). The traditional software development environment is reduced to representations and editors by means of which the runtime system can be observed and modified directly.

Advantages of the design principle or of this architecture include not only the easier modifiability of the runtime system, but also system consistency. All components which contain or reference the meta data are self-descriptive. The composition of the components produces an entire system description. In other words, however the system is modified (e.g. inserting or removing modules), the views (engineering views) are always able to show the currently existing system. UML diagrams, business process diagrams, circuit diagrams, layout plans, etc. are always at the latest status.

Figure 8:
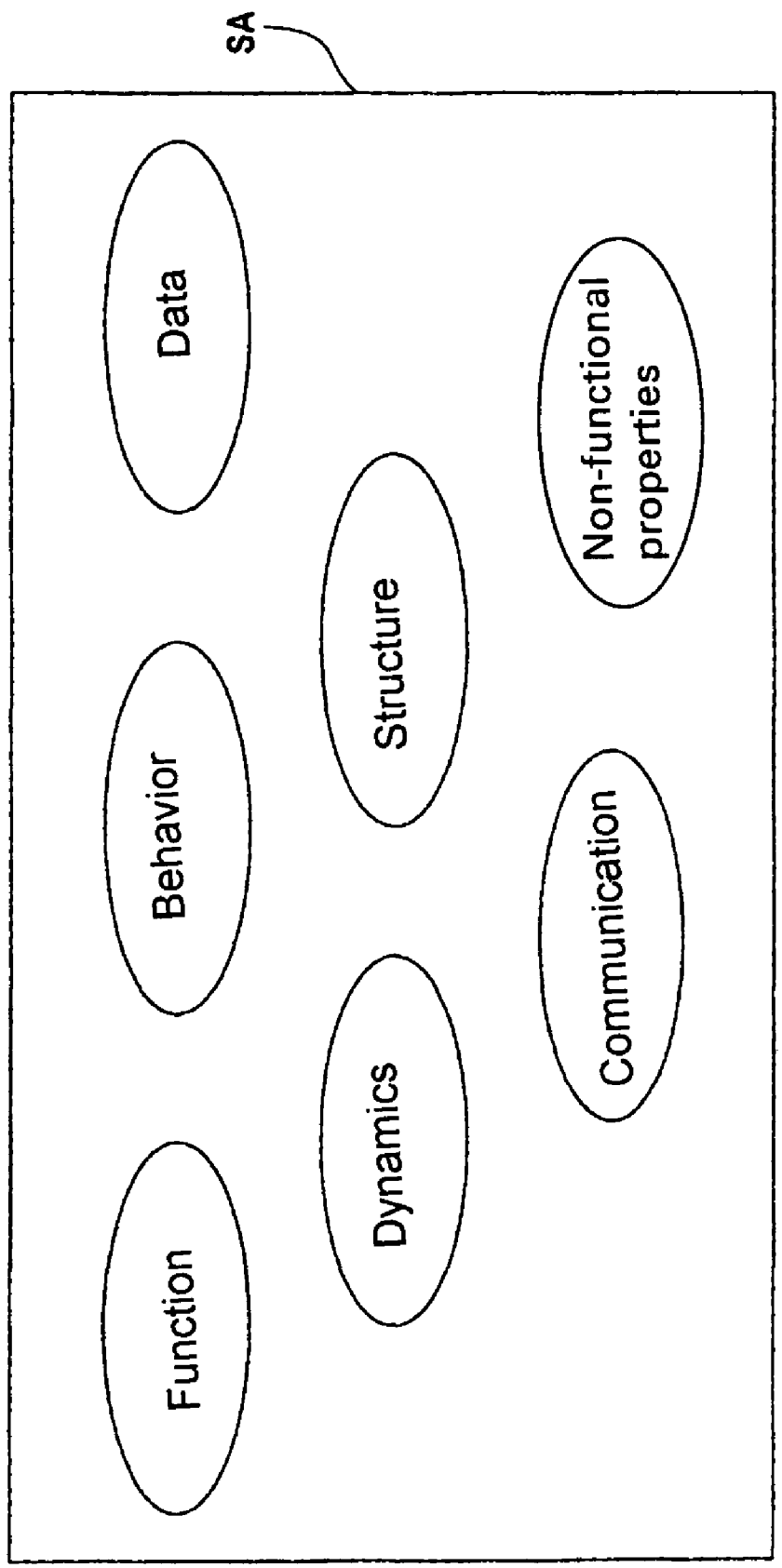
FIG. 8 shows in a graphic representation aspects which determine a software architecture.

The diagram according to FIG. 8 shows the aspects which determine a software architecture SA. The creation of software architectures SA calls for abstract and conceptual thought processes. The architecture proposed according to the invention ensures that no structural hiatus occurs between the analysis phase and the design phase. In an analysis phase, the objects required for a software architecture are identified, linked with meta information and structured as hierarchical trees. The objects can also be laterally and/or horizontally networked with one another and are able to communicate with one another or with the environment via communication mechanisms. The function of a software application that is based on a software architecture is determined by the arrangement of the objects relative to one another. At runtime the objects are then assembled into a software application, whereby the software application inherently contains principles which are predetermined by the software architecture. This ensures that no design break occurs.

A software architecture must take account of different factors, aspects or views. This includes the function which is ultimately to be achieved by a software application which is based on the architecture. The functionality resides typically and in particular in the methods and operations of the objects. The behavior and the dynamics are determined in particular by the interaction of the objects and by the interaction of the operations present in the objects. The data aspect is usually determined via the attributes. The attributes also determine the states of an object, with the states also being determined by the respective connections to other objects. The structural aspect includes the hierarchical structure of a tree with its objects with regard to a "consists of" relation. In a software architecture, however, the structural aspect is also introduced by the "is a" relation. The communication aspect is very important within a software architecture, for the communication mechanisms used ensure that the objects that are used for an application can exchange data with one another, i.e. can communicate, at all. Communication mechanisms include, for example, MQ (Message Queues), what are known as middleware platforms, such as COM, DCOM or CORBA, or also layers that sit on top of them, such as the OPC (OLE for Process Control) protocol. The choice of communication mechanisms has a quite decisive influence on a software architecture. Synchronization mechanisms and the capability to execute in parallel are also influenced by them.

For current software architectures and for software applications that are based on them, the aspect of non-functional properties is becoming increasingly important. Non-functional properties include, for example, modifiability, efficiency, reliability, testability or reusability. The targeted and explicit use of meta information in a software architecture enormously advances the realization of non-functional properties. Owing to the fact that the individual objects contain meta information not only about themselves, but also about the applications in which they are used or in the business processes in which they are used, self-organizations of a software application can be performed very easily, i.e. an automatic recovery can take place without a human operator having to intervene. The said aspects which are important for a software architecture are typically modeled and edited by a user by means of CASE (Computer-Aided Software Engineering) tools with appropriate program editors. These CASE tools form part of a software development environment (SU; FIG. 2). Suitable options for the description of a software architecture as proposed in the invention include, for example, the diagrams provided by the UML (Unified Modeling Language) method.

Meta information can be very elegantly and easily coupled to and/or introduced into objects and also systems through the use of markup languages. XML (Extended Markup Language) in particular offers options allowing easy formulation of meta information. Meta information can be stored in XML for example as elements (enclosed by a start tag and an end tag) or as attributes (directly integrated into a start tag).

To sum up, the invention relates to software applications, software architectures and methods for building software applications, in particular for MES systems, wherein objects (comprising data, attributes, behaviors, functions) for software applications, in particular MES applications, are linked with meta information, the objects are structured as hierarchical trees (with different forms of representation being selectable) and the objects are linked with one another by means of pointers or are networked (laterally and/or horizontally). At runtime the objects are assembled into software applications, with the overall function of the software applications being derived from the structure of the hierarchical trees. Software applications or software architectures can be created for MES systems, for automation systems, for industrial controllers (including motion controllers) and for office applications (office environment).

The above described software application or software development environment according to the invention can be implemented as a computer program in languages known for this purpose. A computer program implemented in such a way can be stored and transported in a likewise known manner via electronic data paths.

The invention claimed is:

1. A software application, comprising objects having and/or referencing data and/or attributes and/or behaviors, wherein the objects run and/or are stored on at least one computing unit, wherein a plurality of the objects each physically comprise meta information about themselves and about the software application, and the objects are linked with meta information at runtime, wherein the objects are structured as hierarchical trees at runtime, wherein the objects are networked laterally and/or horizontally and/or referenced at runtime, wherein the software application is assembled by linking the objects with meta information at runtime, the objects being networked laterally or horizontally, the overall function of the software application being derived from the structure of the hierarchical trees as well as from the networking of the objects in the trees.

2. The software application according to claim 1, wherein the objects and/or referencing mechanisms and/or networking mechanisms and/or implementations of the objects are interchangeable at runtime.

3. The software application according to claim 1, wherein services are added to the objects at runtime.

4. The software application according to claim 1, wherein implementations of the referencing mechanisms or the networking mechanisms or of services are used for data and/or for programs.

5. The software application according to claim 1, wherein the objects are networked statically and/or dynamically.

6. The software application according to claim 1, wherein the meta information comprises static and/or dynamic object models.

7. The software application according to claim 1, wherein the meta information describes an application or a business process.

8. The software application according to claim 1, wherein each individual object comprises the entire meta information relating to the application or the business process.

9. The software application according to claim 1, wherein the trees are represented different on a display device.

10. The software application according to claim 1, wherein in the event of an error the software application reconfigures itself.

11. The software application according to claim 1, wherein the software application is a MES application.

12. A software architecture enabling both assembly and execution of a software application at runtime, the architecture comprising:

objects having and/or referencing data and/or attributes and/or behaviors, wherein the objects run and/or are stored on a computing unit, wherein the objects are linked with meta information at runtime, wherein the objects are structured as hierarchical trees at runtime, wherein the objects are laterally and/or horizontally networked at runtime, wherein a plurality of the objects each physically comprise the meta information, wherein the objects communicate with one another and/or with the environment at runtime by a communication mechanism, so that the software application is assembled at runtime from the linking of the objects with meta information at runtime, and wherein the overall function of the software application which is based on the software architecture is determined from the metadata and the structure of the hierarchical trees and from the networking of the objects in the trees.

13. The software architecture according to claim 12, wherein the objects and/or referencing mechanisms and/or networking mechanisms and/or implementations of the objects and/or communication mechanisms are interchangeable at runtime.

14. The software architecture according to claim 12, wherein services are added to the objects at runtime and each individual object comprises the entire meta information relating to the application or the business process.

15. The software architecture according to claim 12, wherein implementations of the referencing mechanisms or the networking mechanisms or the communication mechanisms or the services are used for data and/or for programs.

16. The software architecture according to claim 12, wherein the objects are networked statically and/or dynamically.

17. The software architecture according to claim 12, wherein the meta information comprises static and/or dynamic object models.

18. The software architecture according to claim 12, wherein the meta information describes an application or a business process.

19. The software architecture according to claim 12, wherein an object comprises the entire meta information relating to an application or a business process.

20. The software architecture according to claim 12, wherein the trees are represented in different views on a display device.

21. The software architecture according to claim 12, wherein in the event of an error the software application based on the software architecture reconfigures itself.

22. The software architecture according to claim 12, wherein the software architecture is used for a MES application.

23. A method for building a software application, comprising:

providing a computing unit;

providing input aids;

providing output aids;

providing a display device;

creating objects which represent units of the software application using the input aids and the display device;

assigning meta information to the objects using the input aids and the display device, wherein a plurality of the objects physically comprise the meta information, including meta information about themselves and about the software application;

structuring the objects as hierarchical trees using the input aids and the display device;

networking the objects at runtime using the input aids and the display device thereby automatically assembling the objects to form the software application at runtime wherein the function of the software application is automatically derived at runtime from the structure of the hierarchical trees, the networking of the objects in the trees, and the assigned meta information.

24. The method according to claim 23, wherein the objects and/or referencing mechanisms and/or networking mechanisms and/or implementations of the objects are interchangeable at runtime.

25. The method according to claim 23, wherein services are added to the objects at runtime and each individual object comprises the entire meta information relating to the application or the business process.

26. The method according to claim 23, wherein implementations of the referencing mechanisms or of the networking mechanisms or of the services are used for data and/or for programs.

27. The method according to claim 23, wherein the objects are networked statically and/or dynamically.

28. The method according to claim 23, wherein the meta information comprises static and/or dynamic object models.

29. The method according to claim 23, wherein the meta information describes an application or a business process.

30. The method according to claim 23, wherein an object comprises the entire meta information relating to the application or a business process.

31. The method according to claim 23, wherein the trees can be represented in different views on a display device.

32. The method according to claim 23, wherein in the event of an error the software application reconfigures itself.

33. The method according to claim 23, wherein the software application is used for a MES system.

34. The method according to claim 23, wherein the method is implemented by a computer program.

35. The method according to claim 34, wherein the computer program is stored on a data medium.

36. The method according to claim 34, wherein the computer program is installed on a data processing device.

37. The method according to claim 23, wherein a software development environment is adapted for performing the method.

38. The method according to claim 37, wherein the software development environment is integrated into a runtime system, with selectable functionalities being accessed via views.

39. The method according to claim 37, wherein the software development environment is implemented by a computer program.

* * * * *